(12) United States Patent
Seid et al.

(10) Patent No.: US 6,209,563 B1
(45) Date of Patent: Apr. 3, 2001

(54) SOLENOID CONTROL VALVE

(75) Inventors: David L. Seid, North Muskegon; Hamid Najmolhoda, Grand Rapids, both of MI (US)

(73) Assignee: Saturn Electronics & Engineering, Inc., Auburn Hills, MI (US)

( * ) Notice: Subject to any disclaimer, the term of this patent is extended or adjusted under 35 U.S.C. 154(b) by 0 days.

(21) Appl. No.: 09/479,415

(22) Filed: Jan. 7, 2000

(51) Int. Cl.$^7$ .................................................. F15B 13/044
(52) U.S. Cl. ........................ 137/15.21; 137/596.17; 137/596.2; 137/625.65
(58) Field of Search ...................... 137/596.17, 596.2, 137/15.21, 625.65

(56) References Cited

U.S. PATENT DOCUMENTS

| | | | |
|---|---|---|---|
| 3,656,076 | 4/1972 | Prouty et al. | 335/240 |
| 3,884,417 | 5/1975 | Sheffield et al. | 239/102 |
| 4,150,925 | 4/1979 | Perkins | 417/418 |
| 4,347,812 | 9/1982 | Kosuda et al. | 123/90.55 |
| 4,522,163 | 6/1985 | Hooper | 123/73 F |
| 4,615,307 | 10/1986 | Kodama et al. | 123/90.16 |
| 4,617,306 | 10/1986 | Welzel et al. | 514/288 |
| 4,631,923 | 12/1986 | Smith | 60/530 |
| 4,696,265 | 9/1987 | Nohira | 123/90.16 |
| 4,789,208 | 12/1988 | Kohno | 303/115 |
| 4,860,794 | 8/1989 | Parrott et al. | 137/637 |
| 4,911,405 | 3/1990 | Weissgerber | 251/129.14 |
| 4,938,545 | 7/1990 | Shuey et al. | 303/119 |
| 4,988,074 | 1/1991 | Najmolhoda | 251/129.08 |
| 5,421,366 | 6/1995 | Naffziger et al. | 137/614.2 |
| 5,456,581 | 10/1995 | Jokela et al. | 417/282 |
| 5,467,797 | 11/1995 | Seetharaman et al. | 137/599 |
| 5,549,274 | 8/1996 | Buchanan et al. | 251/129.14 |
| 5,605,317 | 2/1997 | Mealy et al. | 251/129.01 |
| 5,611,370 | 3/1997 | Najmolhoda | 137/625.61 |
| 5,647,318 | 7/1997 | Feucht et al. | 123/322 |
| 5,673,658 | 10/1997 | Allmendinger | 123/90.12 |
| 5,687,765 | 11/1997 | You | 137/627.5 |
| 5,738,142 | 4/1998 | Eike et al. | 137/596.17 |
| 5,765,515 | 6/1998 | Letsche | 123/90.12 |
| 5,809,950 | 8/1998 | Letsche et al. | 123/90.12 |
| 5,845,667 | 12/1998 | Najmolhoda et al. | 137/1 |
| 5,915,348 | 6/1999 | Scheidt et al. | 123/90 |
| 5,921,526 | 7/1999 | Najmolhoda | 251/65 |
| 5,984,259 | 11/1999 | Najmolhoda et al. | 251/50 |
| 5,996,628 | 12/1999 | Najmolhoda et al. | 137/625.61 |
| 6,019,120 | 2/2000 | Najmolhoda et al. | 137/82 |

Primary Examiner—Gerald A. Michalsky

(57) ABSTRACT

An engine oil solenoid control valve includes a molded one-piece valve nozzle and coil bobbin member that defines a valve nozzle and a solenoid coil bobbin and also defines an integral check valve receiving receptacle at an exhaust port and first and second valve seats for controlling valve stroke. A ball valve is disposed between the valve seats. A simple cylindrical armature rod can be used together with molded integral recesses that balance hydraulic pressure on the armature to prevent a hydraulic lock condition.

11 Claims, 6 Drawing Sheets

US 6,209,563 B1

SOLENOID CONTROL VALVE

FIELD OF THE INVENTION

The present invention relates to an engine oil solenoid control valve for controlling oil pressure for valve lifter activation/deactivation.

BACKGROUND OF THE INVENTION

Internal combustion engines for motor vehicles are known which include a hydraulic system for performing work in addition to lubrication. This work can be used to activate/deactivate cylinders of an internal combustion engine to conserve fuel. Such a hydraulic valve lifter activation/deactivation system can include a hydraulic control valve in a valve housing mechanically connected to a separate solenoid. The solenoid includes a solenoid coil bobbin on which a wire coil is wound and an armature that moves the control valve in response to an input signal (coil electrical current signal) to the wire coil to control hydraulic pressure in the valve lifter oil control gallery. A separate check valve assembly is mounted in a fluid exhaust passage (vent-to-sump) in the engine block or cylinder head and functions to maintain oil pressure in the oil control gallery at a preselected minimum value. Such engine oil control solenoids comprise numerous components which must be assembled together and are known to suffer from hydraulic fluid (oil) leakage through various paths around the solenoid housing.

An object of the present invention is to provide an engine oil solenoid control valve that is simpler and less costly to make and less prone to hydraulic fluid leakage.

SUMMARY OF THE INVENTION

The present invention provides a hydraulic fluid solenoid control valve, such as in one embodiment, an engine oil solenoid control valve including a molded one-piece valve nozzle and bobbin member that defines a valve nozzle region and a coil bobbin region of the solenoid and in addition an integral check valve-receiving receptacle associated with an exhaust port of the control valve.

In a particular embodiment of the invention, the molded one-piece member may further define first and second valve seats for controlling valve stroke and a ball valve disposed between the valve seats. A cylindrical armature rod can be used in an embodiment of the present invention that includes molded integral coil bobbin flutes or recesses disposed in a manner that permits balancing of hydraulic pressure on the armature in a bore of the coil bobbin to prevent a hydraulic lock condition. The foregoing and other objects, features, and advantages of the invention will become apparent from the following more detailed description taken with the accompanying following drawings.

DESCRIPTION OF THE INVENTION

Figure 1:
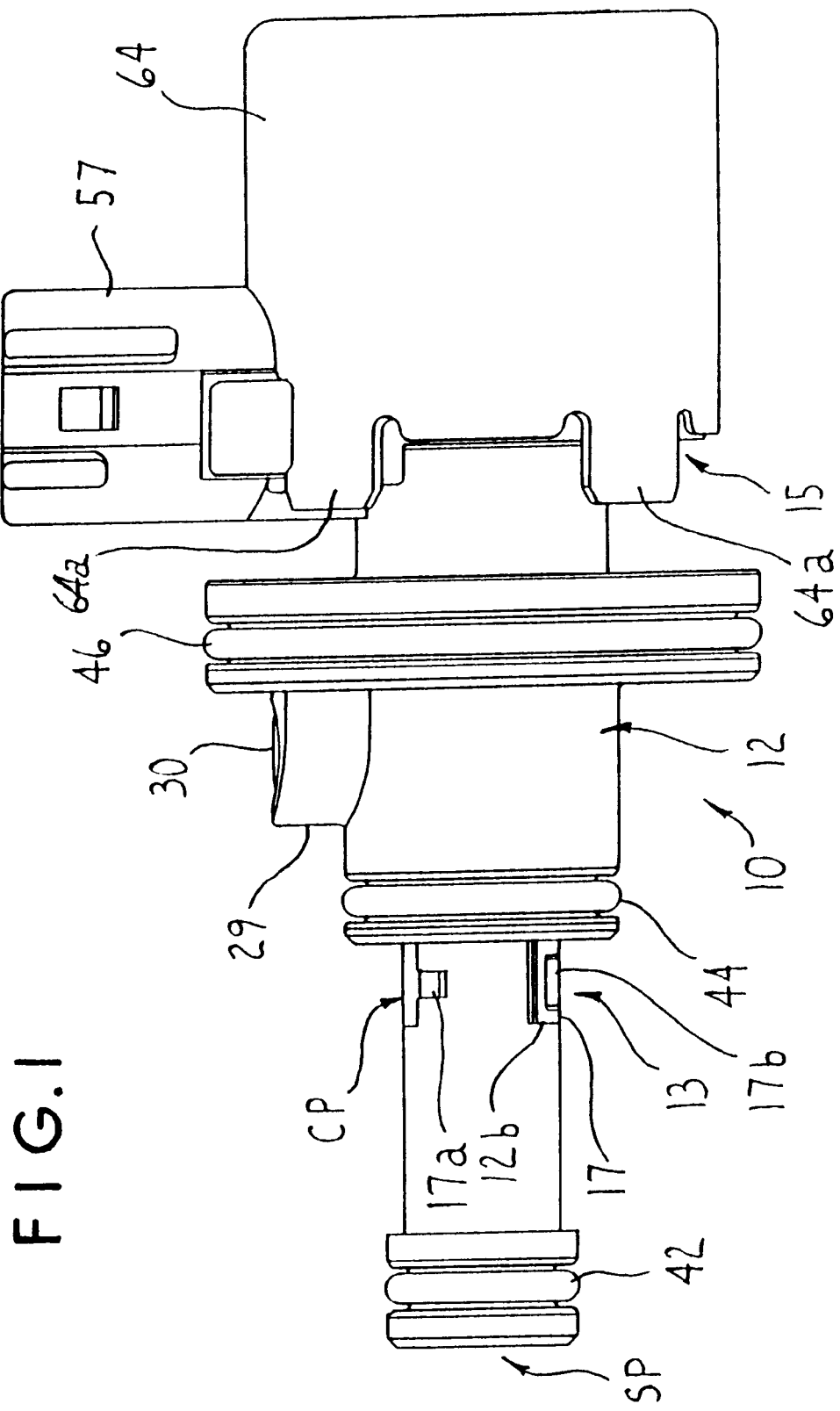
FIG. 1 is an elevational view of an engine oil solenoid control valve pursuant to an embodiment of the invention.
Figure 2:
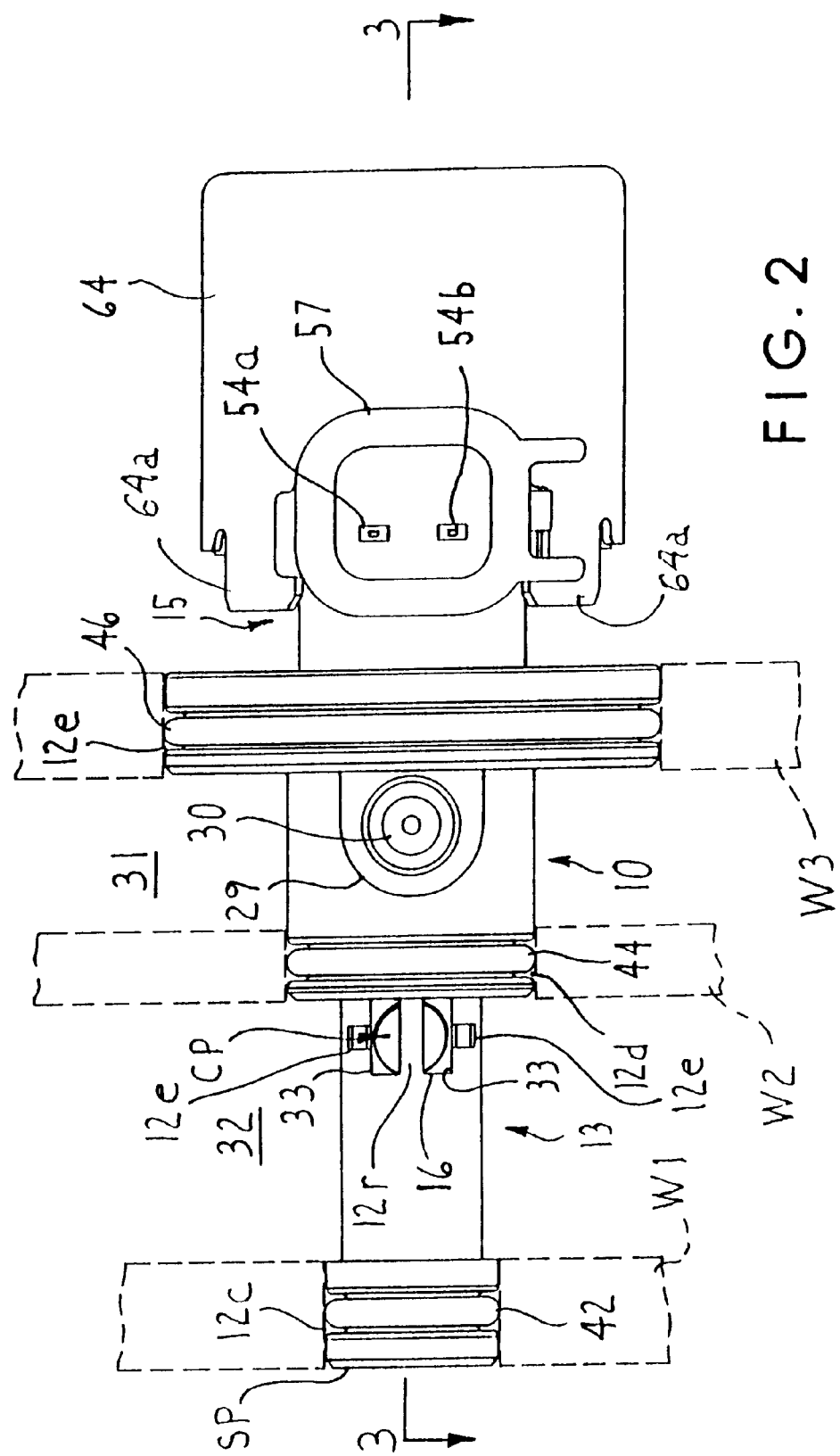
FIG. 2 is a plan view of the engine oil solenoid control valve of FIG. 1.
Figure 3:
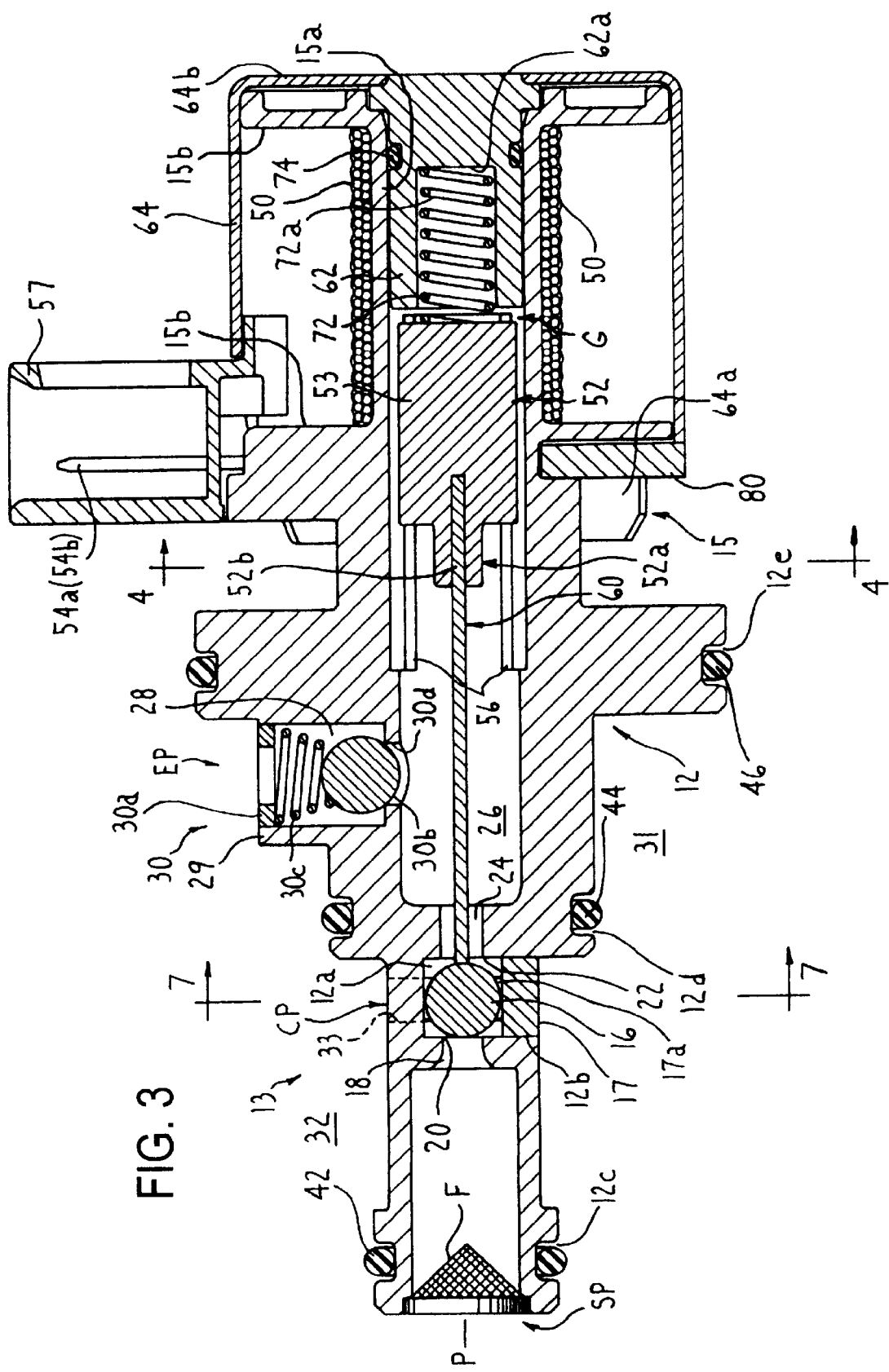
FIG. 3 is a longitudinal sectional view of the engine oil solenoid control valve of FIG. 1.
Figure 5:
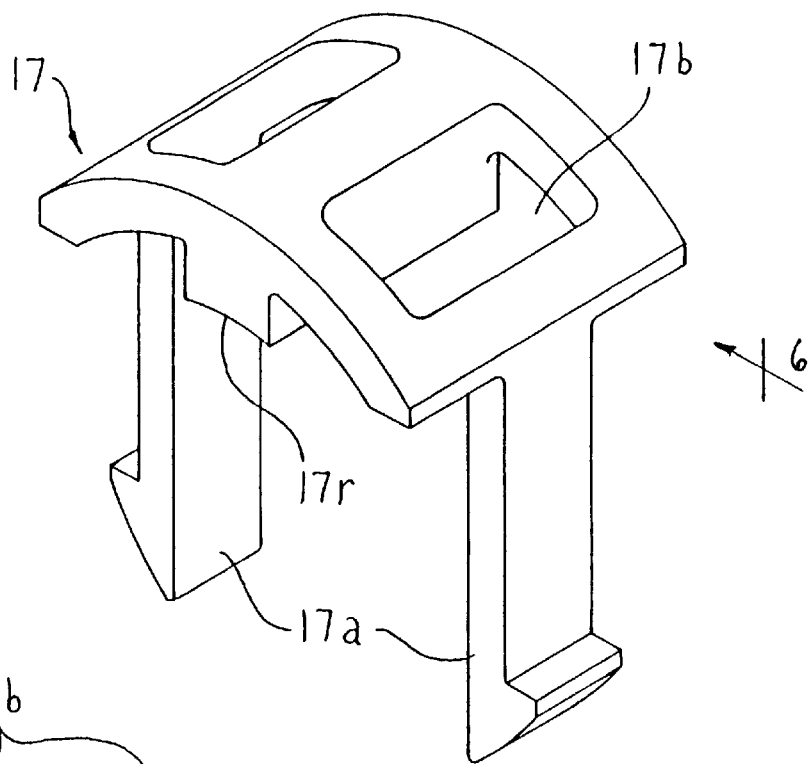
FIG. 5 is a perspective view of the ball valve retainer.
Figure 6:
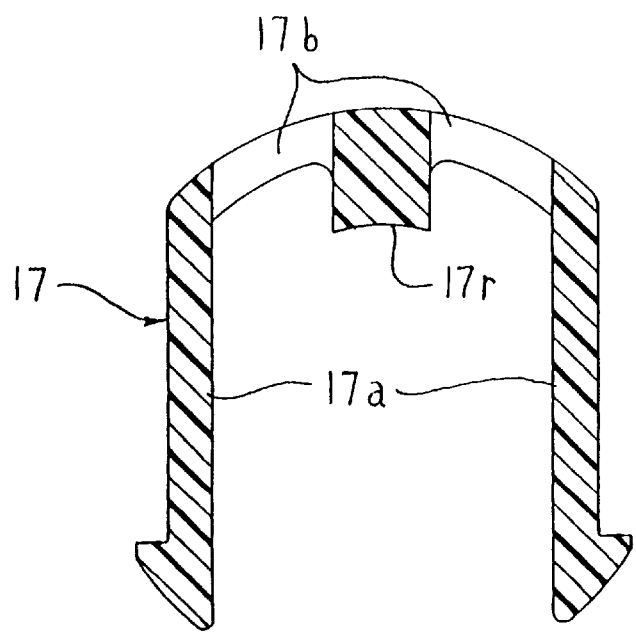
FIG. 6 is a sectional view of the ball valve retainer.

Referring to FIGS. 1 through 3, an engine oil solenoid control valve 10 pursuant to an illustrative embodiment of the invention is shown including a molded one-piece valve nozzle and coil bobbin member 12 forming a valve nozzle region 13 and a coil bobbin region 15. The member 12 can be injection or otherwise molded of a moldable thermoplastic material, such as the high temperature rated, glass fiber reinforced thermoplastic material (e.g. Amodel A1133HS material) described below, or other suitable moldable material. The nozzle region 13 includes a longitudinal supply port SP having a filter F and communicated to a source of hydraulic fluid pressure (not shown), such as a main engine oil pressure port shown schematically as P, in an internal combustion engine block or cylinder head, and a ball valve 16 (or other type of valve) that controls flow of the hydraulic fluid through an orifice 18 that defines a first valve seat 20. A second valve seat 22 is defined on the valve nozzle region 13 at a second orifice 24. Since the first and second valve seats 20, 22 are molded integrally on the member 12, the valve stroke (i.e. motion of ball valve 16 between the seats) is inherently established by the molding operation without the need for separate valve seat inserts and adjustment thereof. The ball valve 16 communicates to one or more side passages 33 (one shown) each defining a control port CP of a hydraulic circuit of a valve lifter activation/deactivation system. The control port-forming passage 33 is formed by openings formed in-situ in the molding process. Another control port also is formed by molded openings 17b in a ball valve retainer 17, FIGS. 5 and 6.

Figure 7:
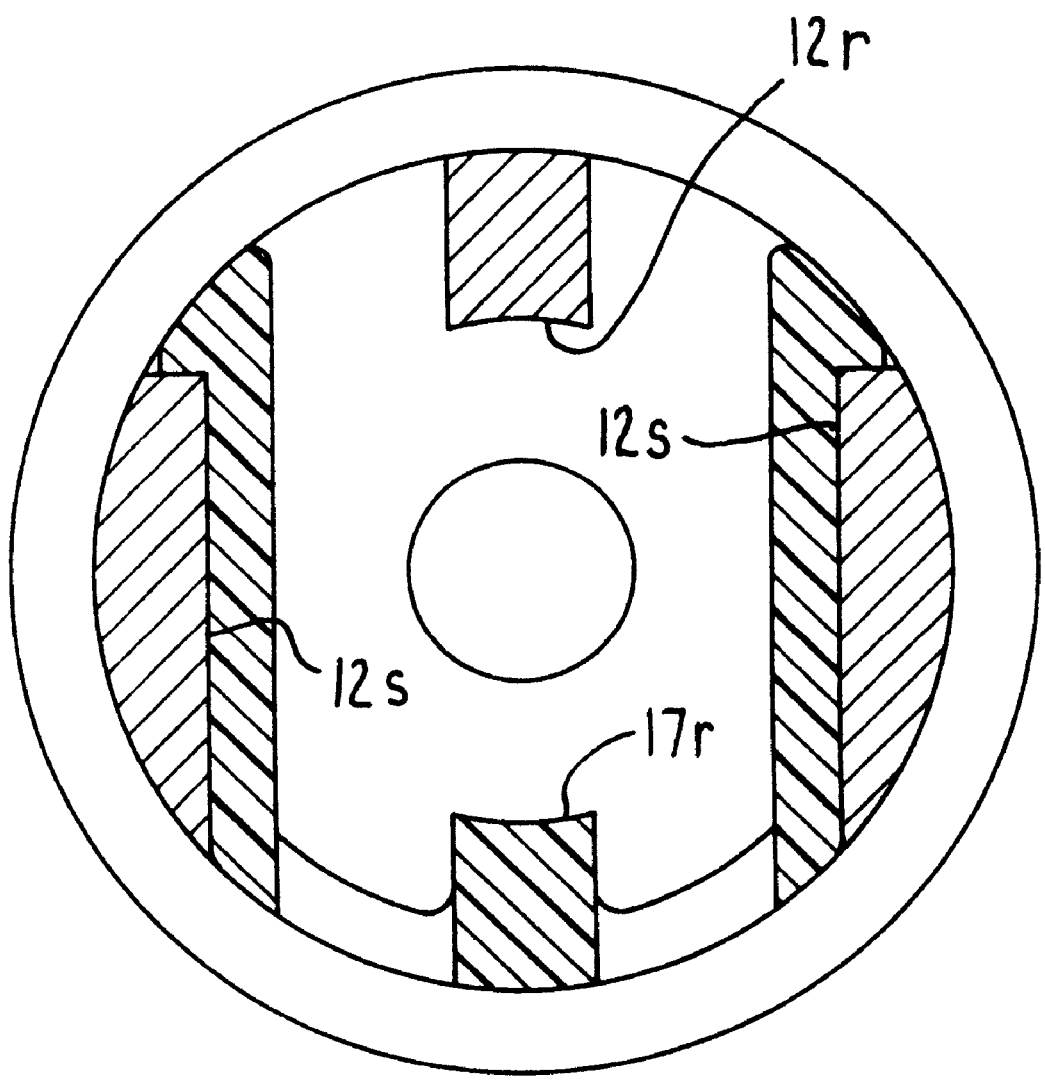
FIG. 7 is a sectional view of the valve nozzle and coil bobbin member taken along lines 7—7 of FIG. 3 showing a ball retainer molded on the valve nozzle and coil bobbin member with the armature omitted for convenience.

The ball valve 16 moves in the molded ball pocket 12a of the member 12 and is retained in a ball retainer 17 via a mechanical interlock which includes two cantilever legs 17a to snap-fit engage in respective slots 12e in nozzle region 13, FIGS. 2, 3, 5 and 6. The ball valve 16 is made of steel (e.g. type 440C steel) or other suitable material. The retainer 17 is made of high temperature rated, glass fiber reinforced thermoplastic (e.g. Amodel A1133HS material available from Amoco Polymers, Inc. and includes control port openings 17b and a pedestal with an arcuate ball retainer surface 17r which, together with an opposing arcuate ball retainer surface 12r, FIG. 7, molded on member 12, position the ball 16 with respect to valve seats 20 and 22. The retainer 17 is held in a side bore 12b of member 12 by the legs 17a that are disposed adjacent shoulders 12s molded on the member in the pocket 12a and that are snap-fit in slots 12e of the member 12. The arcuate ball retainer surface 12r is molded on member 12 so as to overlie ball 16 in pocket 12a, FIG. 2.

Orifice 24 communicates to a longitudinal armature bore or passage 26 that is defined in part in the nozzle region 13 and communicates to a check valve 30 residing in a receptacle 28 formed in boss 29 that is molded integrally on the member 12. The receptacle 28 defines an exhaust port EP. The check valve 30 includes annular cap 30a that is held in the receptacle 28 by heat stacking or ultrasonic welding and a ball check valve 30b made of steel (e.g. type 440C steel) and located between a biasing spring 30c and ball valve seat 30d. Ball valve seat 30d can be formed integral to member 12 by molding or comprise a separate insert in the nozzle region. The check valve 30 communicates to an exhaust passage 31 of the hydraulic valve lifter activation/deactivation circuit. The check valve 30 is provided at the exhaust port EP to prevent oil pressure in an oil control gallery (not shown) of the hydraulic valve lifter activation/deactivation circuit from falling below a preselected minimum oil pressure value such as, for example only, 3 psi, when the hydraulic valve lifter activation/deactivation system is deactivated. In particular, at the closed position of the ball valve 16, FIG. 3, the ball valve 16 does not completely close off orifice 18 such that there is preselected ball valve cracking determined by bias of armature spring 72 effective to provide a 3 psi oil pressure at control ports CP and check valve 30 in armature bore 26. The control ports CP and armature bore 26 are thereby communicated to supply port SP enough to provide the 3 psi hydraulic pressure thereat. The check valve 30 can open against bias of spring 30c as necessary to maintain a 3 psi (or other) oil pressure at the control ports and oil control gallery when the lifter activation/deactivation system is deactivated. The valve nozzle region 13 includes first and second O-ring seals 42, 44 in respective circumferential grooves 12c, 12d molded integrally in the member 12 that mate with walls W1, W2 of a fluid control passage 32 of the hydraulic valve lifter activation/deactivation circuit (not shown) provided in the engine block or engine cylinder head (not shown) with the control passage 32 supplying hydraulic fluid to the oil control gallery. A third O-ring seal 46 is provided in circumferential groove 12e molded integrally on member 12 and together with O-ring 44 mate with walls W2, W3 of a fluid exhaust passage 31 of the hydraulic valve lifter activation/deactivation circuit provided in the engine block or engine cylinder head (not shown) with fluid exhaust passage 31 providing for return of hydraulic fluid to a low pressure sump. As mentioned above, check valve 30 is provided at the exhaust port EP to prevent oil pressure in an oil control gallery of the hydraulic valve lifter activation/deactivation circuit from falling below a preselected minimum oil pressure value such as, for example only, 3 psi.

The coil bobbin region 15 includes an electromagnetic wire coil 50 (partially shown) wound on bobbin sleeve 15a along the length thereof between annular bobbin end walls 15b. The coil 50 is connected to a source of input signals, such as an engine electronic control (EEC) module (not shown), that provides electrical current signals to the coil 50 to control movement of armature 52 that, in turn, controls the position of a ball valve 16 between the closed/open valve positions (on/off) and hydraulic pressure in the valve lifter oil control gallery. The solenoid coil 50 receives the current signals via electrical connectors 54a, 54b that reside in a molded connector housing 57 disposed on member 12 and that are connected to the coil. The connectors 54a, 54b are connected to the signal source (EEC module).

The ball valve 16 is moved between the valve closed position, FIG. 3, and a valve open position displaced to the right in FIG. 3 relative to orifice 18 in response to electrical current signals supplied to solenoid coil 50 from the EEC module (not shown). The ball valve 16 is moved to the open position to activate the hydraulic valve lifter activation/deactivation system and to the closed valve position to deactivate the system.

A simple generally cylindrical armature rod 53 can be used as the armature 52 in an embodiment of the present invention that further includes molded integral arcuate recesses 56 in bore 26. The recesses 56 extend radially into the armature bore 26 on diametrically opposite sides of the bore 26 and along the axis of bore 26 to provide axial paths for hydraulic fluid on opposite lateral ends of the armature 52 to eliminate any imbalanced hydraulic pressures acting thereon (hydraulic lock condition where the armature would remain in open or closed positions). The armature rod 53 typically is made of ferrous material such as steel. A simple, low cost armature rod 53 can be used without the need for a complex geometry armature.

The armature 52 includes a small diameter section 52a that is connected to an armature pin 60 having one end pressed in interference fit into axial end bore 52b of the armature 52 to a preselected axial dimension dictated by the depth of bore 52b and the other pin end engaging the ball valve 16. This controlled dimension of the pin 60 in the armature bore 52b permits close control of the axial gap G between ferromagnetic armature 52 and a ferromagnetic (e.g. steel) pole piece 62 without the need for a calibration of the axial gap. The pole piece 62 is disposed in an end bore of the coil bobbin region 15 by radially compressive forces of O-ring 74 disposed on the pole piece.

Figure 4:
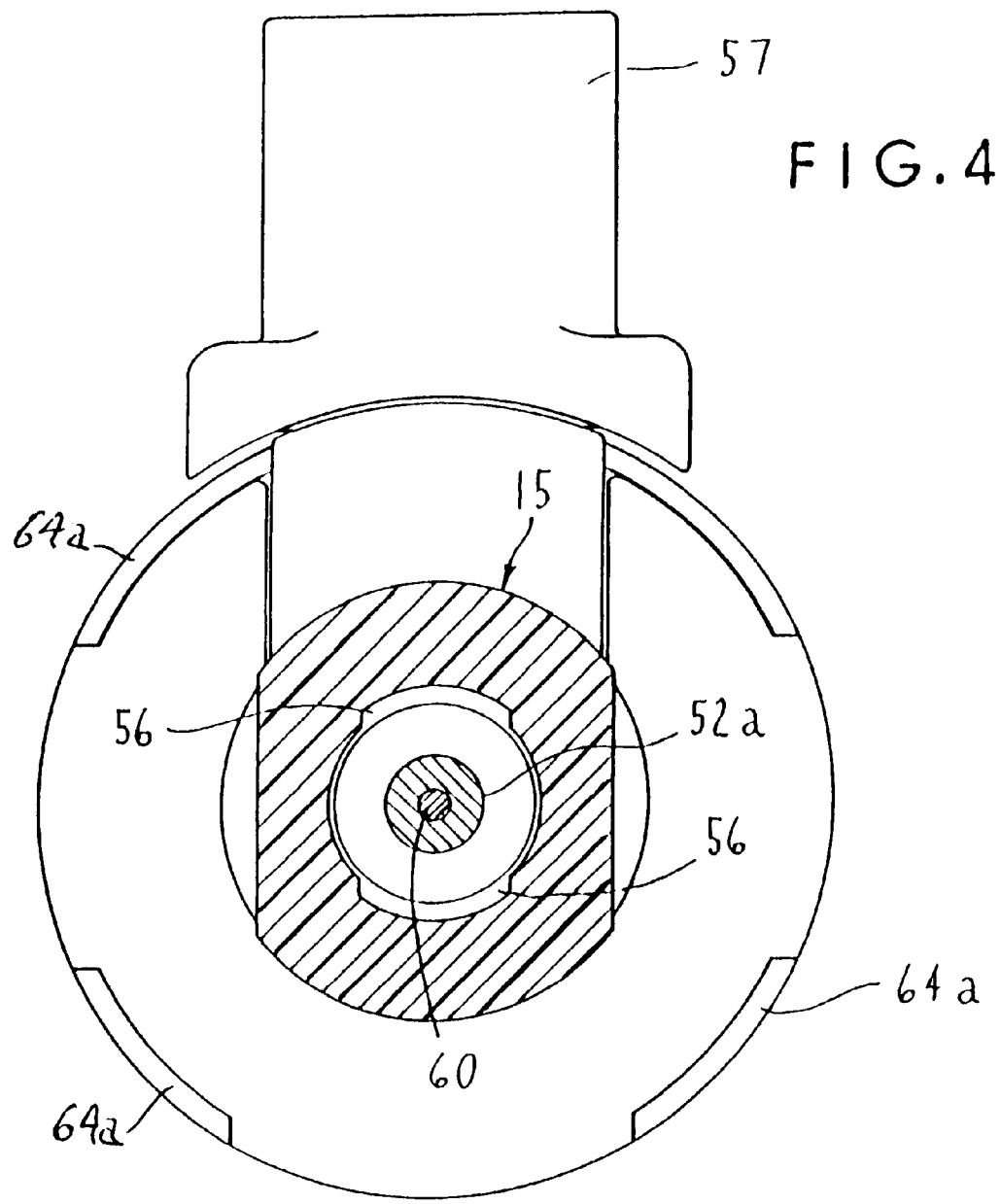
FIG. 4 is a sectional view taken along lines 4—4 of FIG. 3.

The solenoid can or housing 64 typically is made of steel or other magnetically permeable material and includes an axial end flange 64b to axially retain the pole piece 62. The solenoid housing 64 is joined to the member 12 by circumferential or radial tabs 64a crimped, FIG. 4, to overlie the end of the coil bobbin region 15. Tabs 64a are shown prior to crimping in FIGS. 1–3.

A steel flux washer 80 is disposed on the member 12 in a position to concentrate magnetic flux at the armature 52 residing in the armature bore 26. The washer 80 extends about approximately 85% of the periphery of the armature 52.

In FIG. 3, the pole piece 62 is provided with a controlled axial dimension blind bore 62a that receives the end 72a of the spring 72 to avoid the need to calibrate the spring preload using a set screw.

The engine oil solenoid control valve of the invention can be used to control oil pressure in the oil control gallery of an internal combustion engine as part of a hydraulic valve lifter activation/deactivation system. The engine oil solenoid control valve can be made pursuant to a method of the invention by assembling the various solenoid components described above in the molded one-piece valve nozzle and coil bobbin member.

Although the invention is described and shown with respect to ball valve 16 to control fluid flow relative to control port CP, it is not so limited as various other fluid valves, such as for example a spool valve, may be used in lieu of the ball valve to control fluid flow relative to a control or other port. Moreover, although certain preferred embodiments of the invention have been shown and described in detail, it should be understood that variations or modifications may be made without departing from the spirit or scope of the present invention.

What is claimed is:

1. A hydraulic fluid solenoid valve, comprising a one-piece valve nozzle and coil bobbin member defining a solenoid coil bobbin region and an integral nozzle region with a supply port, control port and an exhaust port with a check valve-receiving receptacle, a valve disposed in said nozzle region, a check valve disposed in said receptacle, a wire coil on the coil bobbin region for receiving electrical signals to control armature movement, and an armature received in a bore of the coil bobbin region.

2. The valve of claim 1 wherein said member further is molded to define first and second valve seats in said nozzle region.

3. The valve of claim 1 wherein said valve is a ball valve disposed between said first and second valve seats in a molded pocket of said nozzle region.

4. The valve of claim 3 wherein said ball valve is retained in part by a retainer disposed in said nozzle region.

5. The valve of claim 1 wherein said armature includes a pin for engaging the valve, said pin having an end region received in interference fit in an armature bore.

6. The valve of claim 1 wherein said armature comprises a cylindrical armature rod.

7. The valve of claim 6 wherein said member defines an armature bore having molded integral first and second arcuate recesses that balance hydraulic pressure on the armature.

8. The valve of claim 1 including a pole piece having a blind bore to receive an armature biasing spring.

9. A method of making a hydraulic fluid solenoid valve, comprising providing a one-piece valve nozzle and coil bobbin member to include a solenoid coil bobbin region and an integral nozzle region with a supply port, control port and an exhaust port with a check valve-receiving receptacle, disposing a fluid control valve in said nozzle region, disposing a check valve in said receptacle, disposing a wire coil on the coil bobbin region, and disposing an armature in a bore of the coil bobbin region.

10. The method of claim 9 further including molding said member to include first and second valve seats in said nozzle region.

11. The method of claim 9 further including molding said member to include an armature bore having molded integral first and second arcuate recesses that balance hydraulic pressure on the armature.

* * * * *